US011411746B2

(12) United States Patent
Godfrey

(10) Patent No.: US 11,411,746 B2
(45) Date of Patent: Aug. 9, 2022

(54) SYSTEMS, METHODS, AND STORAGE MEDIA FOR PERMISSIONED DELEGATION IN A COMPUTING ENVIRONMENT

(71) Applicant: CENTRALITY INVESTMENTS LIMITED, Auckland (NZ)

(72) Inventor: Wilfred James Alexander Godfrey, Auckland (NZ)

(73) Assignee: Centrality Investments Limited, Auckland (NZ)

( * ) Notice: Subject to any disclaimer, the term of this patent is extended or adjusted under 35 U.S.C. 154(b) by 509 days.

(21) Appl. No.: 16/422,168

(22) Filed: May 24, 2019

(65) Prior Publication Data

US 2020/0374137 A1 Nov. 26, 2020

(51) Int. Cl.
*H04L 9/32* (2006.01)

(52) U.S. Cl.
CPC .......... *H04L 9/3268* (2013.01); *H04L 9/3247* (2013.01); *H04L 9/3265* (2013.01); *H04L 2209/38* (2013.01)

(58) Field of Classification Search
CPC ... H04L 9/3268; H04L 9/3265; H04L 9/3247; H04L 2209/38; H04L 63/0823; H04L 9/3263; H04L 9/3239
(Continued)

(56) References Cited

U.S. PATENT DOCUMENTS

| | | | |
|---|---|---|---|
| 6,601,171 B1 * | 7/2003 | Carter | H04L 63/08 380/30 |
| 6,904,524 B1 * | 6/2005 | Jaeger, Jr | H04L 9/3247 713/176 |

(Continued)

FOREIGN PATENT DOCUMENTS

| | | | | |
|---|---|---|---|---|
| KR | 20140050121 A | * | 4/2014 | |
| WO | WO-2016163979 A1 | * | 10/2016 | H04L 9/006 |

OTHER PUBLICATIONS

Tuomas Aura, Distributed Access-Rights Management with Delegation Certificates, 1999, In: Vitek J., Jensen C.D. (eds) Secure Internet Programming. Lecture Notes in Computer Science, vol. 1603. Springer, Berlin, Heidelberg, https://doi.org/10.1007/3-540-48749-2_9 , pp. 211-235 (Year: 1999).*

Chadwick, David W. Delegation issuing service, NIST 4th Annual PKI Workshop, 2005—kar.kent.ac.uk.Gaithersburg, USA pp. 62-73 (Year: 2005).*

(Continued)

*Primary Examiner* — Shahriar Zarrineh
(74) *Attorney, Agent, or Firm* — Rimon PC; Marc Kaufman

(57) ABSTRACT

Systems, methods, and storage media, for enforcing transaction permissions delegation in a computing environment are disclosed. Exemplary implementations may: receive a permissions request, from a requesting computing system for a permissions certificate; transmit a login request to a user computing system associated with a user; receive an acceptance from the user in response to the login request; generate a permissions certificate data structure in response to the acceptance; and return the permissions certificate to the requesting computing system whereby the requesting computing system will be permitted to accomplish the transaction with a transacting party in place of the issuer computing system based on possession of the permissions certificate paired with a cryptographic signature based on a private cryptographic key associated with the requesting computing system.

38 Claims, 3 Drawing Sheets

(58) Field of Classification Search
USPC .......................................................... 713/158
See application file for complete search history.

(56) References Cited

U.S. PATENT DOCUMENTS

| | | | | |
|---|---|---|---|---|
| 7,340,601 | B2* | 3/2008 | Wray | G06Q 20/3821 |
| | | | | 713/156 |
| 8,583,470 | B1* | 11/2013 | Fine | G06Q 40/04 |
| | | | | 705/7.31 |
| 8,601,283 | B2* | 12/2013 | Jogand-Coulomb | G06F 21/10 |
| | | | | 713/193 |
| 9,098,675 | B1* | 8/2015 | Roth | H04L 63/0884 |
| 9,137,234 | B2* | 9/2015 | Koster | G06F 21/33 |
| 2002/0029337 | A1* | 3/2002 | Sudia | G06Q 20/401 |
| | | | | 380/282 |
| 2002/0069174 | A1* | 6/2002 | Fox | G06Q 30/06 |
| | | | | 705/52 |
| 2002/0188605 | A1* | 12/2002 | Adya | G06F 16/957 |
| 2002/0194209 | A1* | 12/2002 | Bolosky | G06F 16/137 |
| 2003/0012386 | A1* | 1/2003 | Kim | H04L 9/3226 |
| | | | | 380/286 |
| 2003/0078880 | A1* | 4/2003 | Alley | G06F 21/645 |
| | | | | 705/38 |
| 2003/0079134 | A1* | 4/2003 | Manchala | H04L 63/0823 |
| | | | | 713/182 |
| 2003/0145223 | A1* | 7/2003 | Brickell | G06Q 20/3821 |
| | | | | 726/10 |
| 2004/0083359 | A1* | 4/2004 | Camus | H04L 9/3263 |
| | | | | 713/156 |
| 2005/0060584 | A1* | 3/2005 | Ginter | H04N 21/8355 |
| | | | | 726/4 |
| 2005/0114653 | A1* | 5/2005 | Sudia | H04L 9/3263 |
| | | | | 713/158 |
| 2006/0117382 | A1* | 6/2006 | Karabulut | H04L 9/3265 |
| | | | | 726/10 |
| 2007/0143860 | A1* | 6/2007 | Hardt | H04L 63/105 |
| | | | | 726/28 |
| 2007/0150723 | A1* | 6/2007 | Estable | H04W 12/06 |
| | | | | 713/155 |
| 2007/0198434 | A1* | 8/2007 | Jang | H04N 21/4405 |
| | | | | 705/67 |
| 2008/0010451 | A1* | 1/2008 | Holtzman | H04L 9/3263 |
| | | | | 713/158 |
| 2008/0034440 | A1* | 2/2008 | Holtzman | G06F 21/10 |
| | | | | 726/27 |
| 2010/0138652 | A1* | 6/2010 | Sela | H04L 9/3268 |
| | | | | 713/158 |
| 2014/0020051 | A1* | 1/2014 | Lu | G06F 21/6218 |
| | | | | 726/1 |
| 2014/0164776 | A1* | 6/2014 | Hook | H04L 9/3247 |
| | | | | 713/171 |
| 2014/0380429 | A1* | 12/2014 | Matsugashita | H04L 63/0884 |
| | | | | 726/4 |
| 2016/0344735 | A1* | 11/2016 | Blinn | H04L 63/10 |
| 2017/0317837 | A1* | 11/2017 | Alrawais | H04L 9/321 |
| 2018/0103032 | A1* | 4/2018 | Bisantz | H04L 63/0823 |
| 2018/0109390 | A1* | 4/2018 | Spratte | H04L 9/006 |
| 2018/0295506 | A1* | 10/2018 | Hawkes | H04L 9/3265 |
| 2018/0351973 | A1* | 12/2018 | Becker | H04L 63/1416 |
| 2019/0140848 | A1* | 5/2019 | Dontov | H04L 9/006 |

OTHER PUBLICATIONS

International Searching Authority, International Search Report and Written Opinion for International Application No. PCT/IB20/54299 dated Aug. 4, 2020.

* cited by examiner

SYSTEMS, METHODS, AND STORAGE MEDIA FOR PERMISSIONED DELEGATION IN A COMPUTING ENVIRONMENT

FIELD OF THE DISCLOSURE

The present disclosure relates to systems, methods, and storage media, for delegation of transaction permissions in a computing environment.

BACKGROUND

When working within a distributed computing environment it is often necessary to authenticate a user device. For example, when using a social media platform, a user will be asked to log in to an account, using a username and password for example, to verify the user and expose the user to the appropriate information and services. A similar situation arises when a user accesses a site, such as a news site, that provides subscription content. When navigating the World Wide Web, or other networked computing systems, users are often asked to log into multiple web sites to access their corresponding account for each web site.

In some instances, a trusted third party will act as a certificate authority to provide identity/permissions to a user for multiple web sites in multiple domains. For example, GOOGLE™ provides "Google Sign-In", an authentication system, and a corresponding application programming interface (API), that enables users to log into various cooperating web sites with their GOOGLE™ account. Platforms like Google Sign-In, often referred to as "single sign-on" systems (SSO), greatly reduce the friction associated with authentication in a distributed computing environment. In an SSO, the administrator, such as a GOOGLE™, acts as a centralized identity provider that verifies the identity of users for the service provider and provides a certificate that delegates access.

However, there are several limitations with known SSO systems. As an example, service providers must expose their user data to the third-party identity provider. Further, while some SSO providers cover a broad range of users, a service provider cannot be sure an acceptable subset of their potential users will be covered, leaving the need for an alternative mechanism for authentication. Also, there is a single point of failure in authentication when an SSO provider goes down. Additionally, the SSO model requires a trusted centralized party to maintain identity records and issue identity certificates. This arrangement is entirely incompatible with many new "decentralized" architectures that are based on distributed ledger technology (DLT) such as blockchain technology. Such architectures, by design, are peer-to-peer and avoid centralized trusted parties.

GOOGLE™ "macaroons" are flexible authorization credentials for Cloud services that support decentralized delegation between principals. Macaroons are based on a construction that uses nested, chained MACs (e.g., HMACs). Macaroons are bearer credentials, like Web cookies, but which can specify when, where, by who, and for what purpose a target service should authorize requests. However, macaroons also require a trusted centralized party to issue the credentials and thus are entirely incompatible with many decentralized architectures such as blockchain technology.

Due to the nature of blockchain technology, blockchain access control is focused on two solutions: 1) transactions submitted by applications are signed by a single device; and 2) transactions signed by an application are "executed" by a permissioned identity smart contract. These approaches may be used together in various ways if necessary, but the result is largely the same. When transactions are signed by a single device, every signature must be approved manually (there is no way to trust an application for certain actions), and the user must have access to the device while using the applications. When transactions are executed by a permissioned smart contract, permissions cannot be enforced against deep internal transactions and there is a need for increased network resources (and related fees such as Gas in the Ethereum protocol). Further, in current blockchain implementations, attenuated permissions (i.e., permissions that are some subset of a full permission set) is difficult to achieve. The signing mechanism of such implementations essentially require the user to authorize every interaction/transaction without delegation. Reusing/delegating permission is important to achieve the balance of security and usability in applications. Smart contracts, i.e. executable code recorded on a blockchain can address this to some level. However, these implementations are expensive, difficult to use, and are unable to enforce permissions adequately, leaving users vulnerable.

SUMMARY

The present disclosure relates to a system and method in which cryptographic proofs and signatures are leveraged to allow any party to act as an issuer of permissions certificates and for any other party to verify the permissions certificate. The permissions certificate includes identities and permissions and thus can be used to delegate various transaction permissions to other parties. Disclosed implementations reduce or eliminate many of the limitations of current authentication systems such as SSO systems.

One aspect of the present disclosure relates to a system for enforcing transaction permissions delegation in a computing environment. The system may include one or more hardware processors configured by machine-readable instructions. The processor(s) may be configured to receive a permissions request, from a requesting computing system, for a permissions certificate. The permissions request may specify permissions to execute a transaction and a cryptographic public key associated with the requesting computing system. The processor(s) may be configured to transmit a login request to a user computing system associated with a user. The login request may cause a login interface to be displayed on the user computing system. The processor(s) may be configured to receive an acceptance from the user in response to the login request. The processor(s) may be configured to generate a permissions certificate data structure in response to the acceptance. The data structure may include the cryptographic public key associated with the requesting computing device, a cryptographic public key associated with the issuer computing system, a permissions indication indicating permissions held by the issuer computer system, and a certificate signature of the issuer private key against the certificate object. The processor(s) may be configured to return the permissions certificate to the requesting computing system whereby the requesting computing system will be permitted to accomplish the transaction with a transacting party in place of the issuer computing system based on possession of the permissions certificate paired with a cryptographic signature based on a private cryptographic key associated with the requesting computing system.

Another aspect of the present disclosure relates to a method for enforcing transaction permissions delegation in a computing environment. The method may include receiving a permissions request, from a requesting computing system, for a permissions certificate. The permissions request may specify permissions to execute a transaction and a cryptographic public key associated with the requesting computing system. The method may include transmitting a login request to a user computing system associated with a user. The login request may cause a login interface to be displayed on the user computing system. The method may include receiving an acceptance from the user in response to the login request. The method may include generating a permissions certificate data structure in response to the acceptance. The data structure may include the cryptographic public key associated with the requesting computing device, a cryptographic public key associated with the issuer computing system, a permissions indication indicating permissions held by the issuer computer system, and a certificate signature of the issuer private key against the certificate object. The method may include returning the permissions certificate to the requesting computing system whereby the requesting computing system will be permitted to accomplish the transaction with a transacting party in place of the issuer computing system based on possession of the permissions certificate paired with a cryptographic signature based on a private cryptographic key associated with the requesting computing system.

Yet another aspect of the present disclosure relates to a non-transient computer-readable storage medium having instructions embodied thereon, the instructions being executable by one or more processors to perform a method, implemented by a certificate issuer computing system, for transaction permissions delegation in a computing environment. The method may include receiving a permissions request, from a requesting computing system for a permissions certificate. The permissions request may specify permissions to execute a transaction and a cryptographic public key associated with the requesting computing system. The method may include transmitting a login request to a user computing system associated with a user. The login request may cause a login interface to be displayed on the user computing system. The method may include receiving an acceptance from the user in response to the login request. The method may include generating a permissions certificate data structure in response to the acceptance. The data structure may include the cryptographic public key associated with the requesting computing device, a cryptographic public key associated with the issuer computing system, a permissions indication indicating permissions held by the issuer computer system, and a certificate signature of the issuer private key against the certificate object. The method may include returning the permissions certificate to the requesting computing system whereby the requesting computing system will be permitted to accomplish the transaction with a transacting party in place of the issuer computing system based on possession of the permissions certificate paired with a cryptographic signature based on a private cryptographic key associated with the requesting computing system.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this disclosure, wherein like reference numerals designate corresponding parts in the various figures. It is to be expressly understood, however, that the drawings are for the purpose of illustration and description only and are not intended as a definition of the limits of the claimed invention. As used in the specification and in the claims, the singular form of "a", "an", and "the" include plural referents unless the context clearly dictates otherwise.

DETAILED DESCRIPTION

There is a need for a decentralized app ecosystem with powerful, seamless authentication and access control. Distributed applications (D-Apps) in blockchain ecosystems will be hindered from achieving mainstream appeal as long as the authentication experience lags behind that provided by centralized applications. Given the dangers of private key transmission and the consumer requirement for good user experience (UX), an identity/permissions system other than on-chain identity contracts is needed for decentralized environments. The implementations disclosed herein address this problem. The concept is a simple yet powerful one, enabling a classical "centralized" user experience in various computing environments, including a blockchain or other decentralized environment. At its simplest, the disclosed permissions certificate is a certificate delegating access, or other permissions, from one address (entity) to another.

The invention leverages the known concept of "digital signatures", sometimes referred to as "cryptographic signatures." A cryptographic signature is a mechanism that binds a person/entity to digital data. This binding can be independently verified by a receiving party as well as any third party in a known manner, such as through the verification process described below. The signature is a cryptographic value that is calculated from the data and a secret key ("private key") known only by the signing party.

Cryptographic signature schemes are based on public key cryptography and can be used to verify the source of information. Each party has a public-private key pair. The private key is used for signing and the public key can be used as the verification key. The private key cannot be derived from the public key. Typically, the signing party generates a hash value (using a hash algorithm such as SHA1, MD5, SHA256 . . . ) based on specific data as the input to the hash algorithm. The hash value and private key are then fed to the signature algorithm, such as the RSA algorithm for example, which produces the signature on given hash. The signature is appended to the data and then both are sent to the verifying party. Since the private key is something only the signing party has, it can be the basis of identity/trust. To verify a signature, the verifying party calculates a hash of the same data, decrypts the digital signature using the signing party's public key, and compares the 2 hash values. If the hash values match, the signature is deemed to be valid, i.e. verified.

Figure 1:
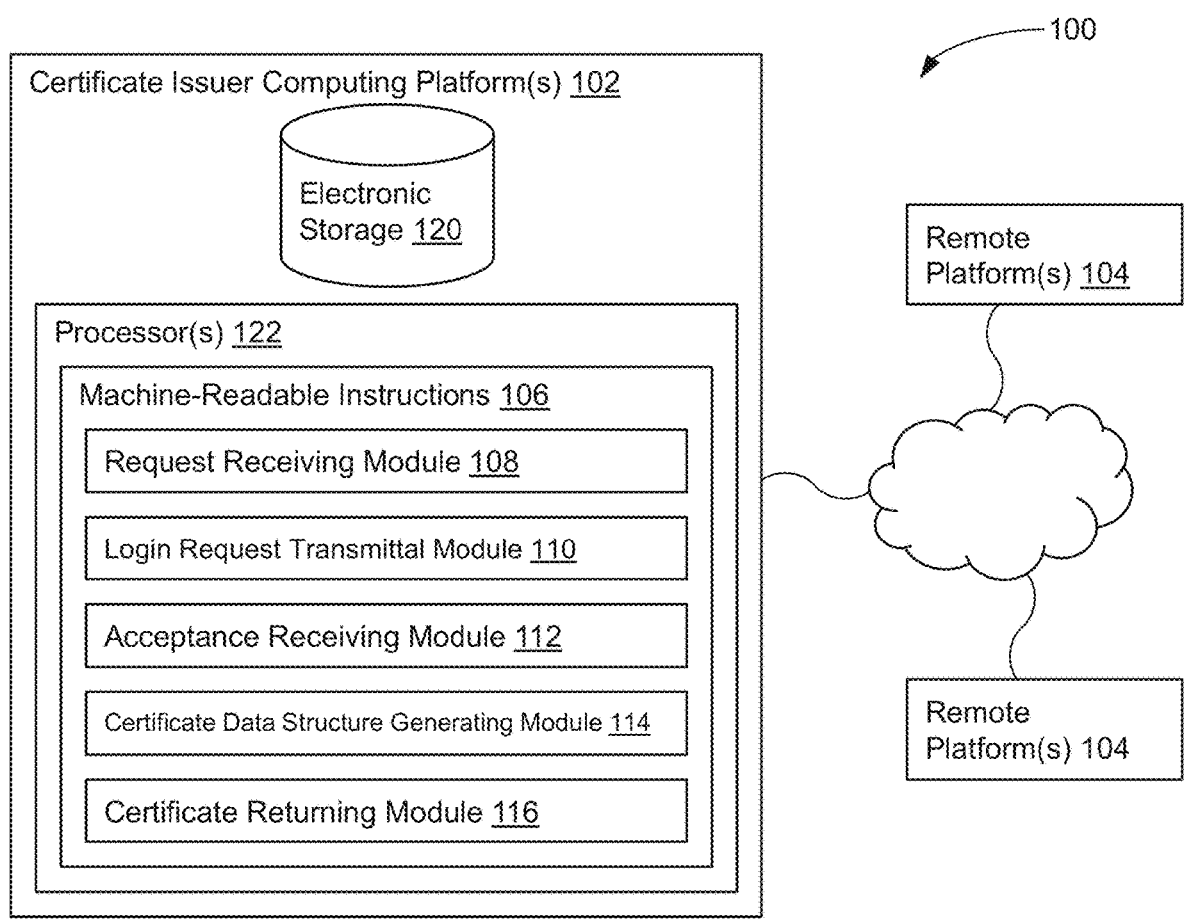
FIG. 1 schematically illustrates a computing architecture for the delegation of transaction permissions in a computing environment, in accordance with one or more implementations.

FIG. 1 illustrates a system 100 including certificate issuer computing system 102 for acting as a certificate issuer for permissions delegation in a computing environment in accordance with one or more implementations. It will be seen that, any/all system(s) in a computing architecture can act as a certificate issuer. The certificate issuer need not be a dedicated or centralized party but can be any one or more of the systems in the environment such as a service provider web site.

Therefore, system 100 may include one or more certificate issuer computing systems 102, which may be configured to communicate with one or more other computing platforms, such as remote computing platforms 104 according to a peer-to-peer architecture, a client/server architecture and/or other architectures. Remote computing platform(s) 104 may be configured to communicate with other remote computing platforms according to a peer-to-peer architecture and/or other architectures. Users may request various transactions, such as access to a computing environment, via remote computing platform(s) 104, which can be associated with a user and which are sometimes referred to as "user devices" herein. Remote computing platforms also can be service provider computing systems. Note that Certificate issuer system 102 and remote computing platforms are shown in FIG. 1 as distinct devices, based on function, for the sake of clarity. However, each device on a network, including remote platforms 104, can act as a certificate issuer. Further, certificate issuer computing system 102 can be a remote computing platform 104.

Each certificate issuer computing system 102 may be configured by machine-readable instructions 106. Machine-readable instructions 106 may include one or more computer program instruction modules. The instruction modules may include one or more of request receiving module 108, login request transmittal module 110, acceptance receiving module 112, certificate data structure generating module 114, certificate returning module 116, and/or other instruction modules.

Request receiving module 108 may be configured to receive a permissions request, from a requesting computing system, such as a remote computing platform 104 associated with a service provider, for a permissions certificate which delegates permissions to the remote computing platform 104. The permissions request may further specify a public address of the certificate issuer computing system 102.

Login request transmittal module 110 may be configured to transmit a login request to a user computing system, such as a remote computing platform 104, associated with a user who has permissions to access the certificate issuer computing system. The login request may cause a login interface to be displayed on the user computing system. Acceptance receiving module 112 may be configured to receive an acceptance from the user in response to the login request. The acceptance indicates that the user approves delegated permissions for the remote computing platform 104 making the permissions request.

Certificate data structure generating module 114 may be configured to generate a permissions certificate data structure in response to the acceptance. By way of non-limiting example, the data structure may include the cryptographic public key associated with the requesting computing device, a cryptographic public key associated with the issuer computing system, a permissions indication indicating permissions held by the issuer computer system, and a certificate signature of the issuer private key against the certificate object. The permissions may include at least one permissions domain. The permissions object may specify the permissions and a permissions domain.

Generating the permissions certificate may include calculating the certificate signature of the issuer private key against the certificate object. Generating the permissions certificate may include creating an empty certificate object. Generating the permissions certificate may include attaching the public cryptographic key associated with the requesting computing device to the certificate object. Generating the permissions certificate may include attaching a public cryptographic key associated with the issuer computing system. Generating the permissions certificate may include attaching a permissions object to the certificate object. Generating the permissions certificate may include attaching the signature to permissions certificate. The permissions request may specify permissions to execute a transaction and a cryptographic public key associated with the requesting computing system.

By way of non-limiting example, the permissions request may be for multiple permissions certificates, each corresponding to a specific transaction. The permissions certificate may include an expiration condition and wherein the verifying includes checking to see if the expiration condition has been satisfied. As described in greater detail below, the requesting computing system may be configured to build a request for the transaction, attach a generated permissions certificate to the request for the transaction, generate a cryptographic proof of the transaction request, and transmit the transaction request. The transaction may be access to at least one of computing resources and/or a physical property.

The concept of "proofs" is well known in cryptography. Proofs are a mechanism by which one party (the prover) can prove to another party (the verifier) that they know a value x, without necessarily conveying any information apart from the fact that they know the value x. "Zero-knowledge proofs" are proofs where the prover does not convey the underlying information. Examples of proof protocols are the Schnorr Protocol and Sigma Protocols. A proof can be verified in various known manners, such as through one or more challenges such that the responses from the prover will convince the verifier if and only if prover does possess the claimed knowledge. Therefore, the proof allows a party to verify that the issuer of the permissions certificate is a party that receives the permissions request.

The permissions indication may be a data structure indicating a subset of permissions held by the user for the issuer computer system or full permissions. An empty permissions indicator can indicate a default, such as full permissions.

Certificate returning module 116 may be configured to return the permissions certificate to the requesting computing system whereby the requesting computing system will be permitted to accomplish the transaction with a transacting party in place of the issuer computing system based on possession of the permissions certificate paired with a cryptographic signature based on a private cryptographic key associated with the requesting computing system. The transacting party may verify the permissions certificate by verifying the certificate signature and verifying the cryptographic proof. The verifying may further include checking for revocation of the permissions certificate.

The permissions certificate may indicate the right for the holder of the certificate to grant further permissions to another party. The further permissions may be a subset of permissions held by the issuer computer system. For example, the holder can request a permission certificate from an issuer and the issuer constructs a certificate that specifies a relationship of holder and issuer with their public keys respectively. The issuer signs the certificate to lock in the relationship as well as create a verifiable proof and returns the certificate to the holder. The holder when actioning the delegation (i.e., acting as an issuer for a specified permission), attaches the certificate with the transactions sent to the transaction party and the transaction party interprets the certificate and, if the certificate is valid, allows the holder to act as the issuer as defined by the attenuated permissions object.

In some implementations, multiple permissions certificates are generated for each specific transaction. In some implementations, the permission certificate may be part of a tree of permissions certificates that can be used to verify a permission through a chain of multiple parties. In some implementations, the computing environment may be a decentralized computing environment. In some implementations, the computing environment may include a blockchain ledger and peer-to-peer nodes.

The various devices, platforms, and systems may be operatively linked via one or more electronic communication links. For example, such electronic communication links may be established, at least in part, via a network such as the Internet and/or other networks. Certificate issuer computing platforms(s) 102 and remote computing platform(s) 104 may include electronic storage 120, one or more processors 122, and/or other components. The platforms may include communication lines, or ports to enable the exchange of information with a network and/or other computing platforms. The computing platforms may include a plurality of hardware, software, and/or firmware components operating together to provide the functionality attributed herein.

Figure 2:
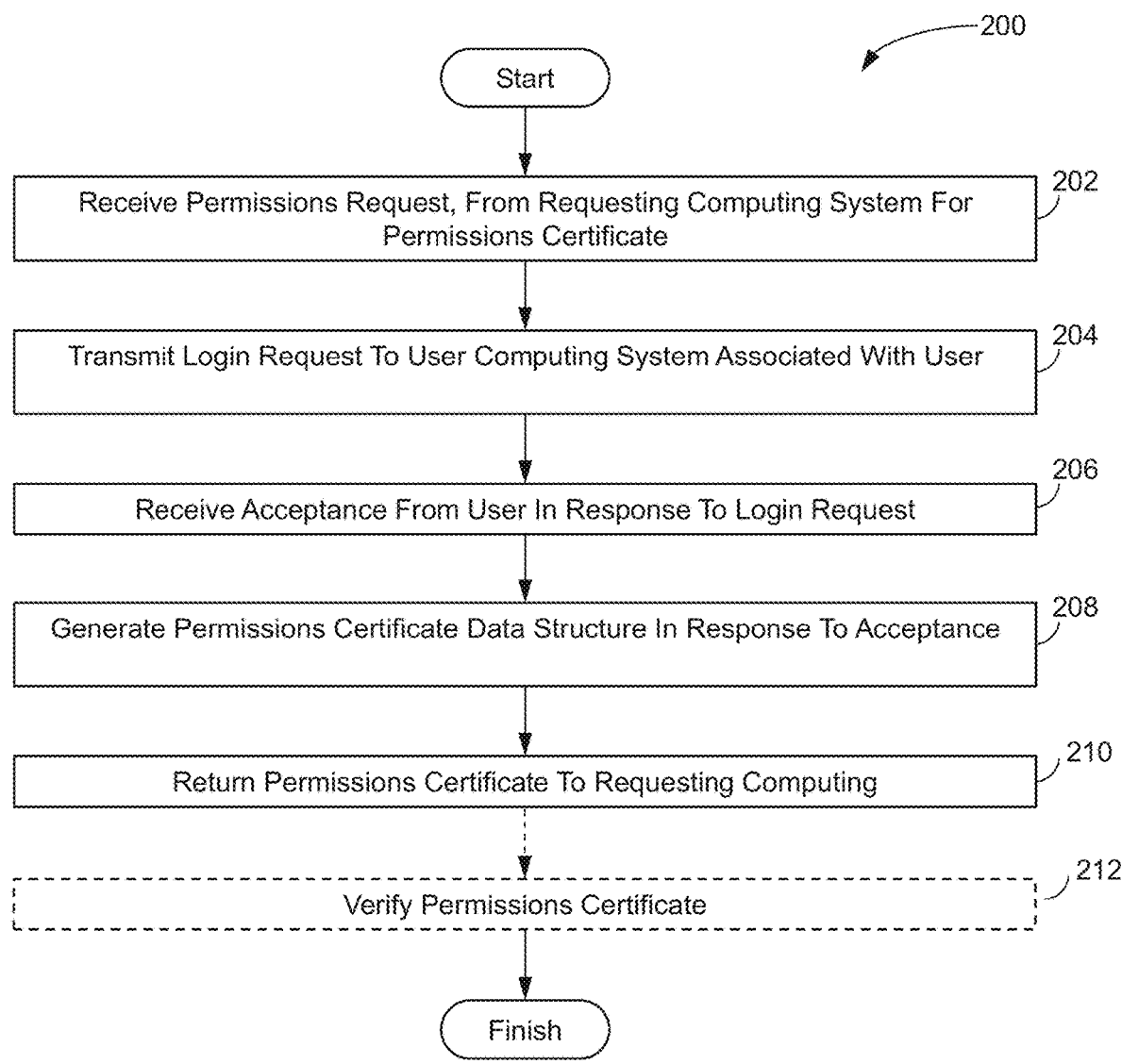
FIG. 2 is a flowchart of a method, implemented by a certificate issuer computing system, for enforcing transaction permissions delegation in accordance with one or more implementations.

FIG. 2 illustrates a method 200 for transaction permissions delegation in a computing environment, in accordance with one or more implementations. Method 200 can be implemented by certificate issuer platform 102 of FIG. 1, for example. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving a permissions request, from a requesting computing system for a permissions certificate. The permissions request may specify permissions to execute a transaction and a cryptographic public key associated with the requesting computing system. Operation 202 may be performed by one or more hardware processors configured by machine-readable instructions including a module that is the same as or similar to request receiving module 108, in accordance with one or more implementations.

An operation 204 may include transmitting a login request to a user computing system associated with a user. The login request may cause a login interface to be displayed on the user computing system. Operation 204 may be performed by one or more hardware processors configured by machine-readable instructions including a module that is the same as or similar to login request transmittal module 110, in accordance with one or more implementations.

An operation 206 may include receiving an acceptance from the user in response to the login request. The acceptance can be in response to a user inputting their username and password, or other identifying indicia, into a user interface on the user device. Operation 206 may be performed by one or more hardware processors configured by machine-readable instructions including a module that is the same as or similar to acceptance receiving module 112, in accordance with one or more implementations.

An operation 208 may include generating a permissions certificate data structure in response to the acceptance. The data structure may include the cryptographic public key associated with the requesting computing device, a cryptographic public key associated with the issuer computing system, a permissions indication indicating permissions held by the issuer computer system, and a certificate signature of the issuer private key against the certificate object. Operation 208 may be performed by one or more hardware processors configured by machine-readable instructions including a module that is the same as or similar to certificate data structure generating module 114, in accordance with one or more implementations.

An operation 210 may include returning the permissions certificate to the requesting computing system whereby the requesting computing system will be permitted to accomplish the transaction with a transacting party in place of the issuer computing system based on possession of the permissions certificate paired with a cryptographic signature based on a private cryptographic key associated with the requesting computing system. Operation 210 may be performed by one or more hardware processors configured by machine-readable instructions including a module that is the same as or similar to certificate returning module 116, in accordance with one or more implementations.

An operation 212 may include various checks to verify the permissions certificate, as described in greater detail below. Verification may include checking for revocation of, checking for expiration of, and checking validity of, the permissions certificate. Operation 212 is shown in dashed box in FIG. 2 as it is often accomplished as a separate workflow from the request and generation procedures of operations 201-210.

Figure 3:
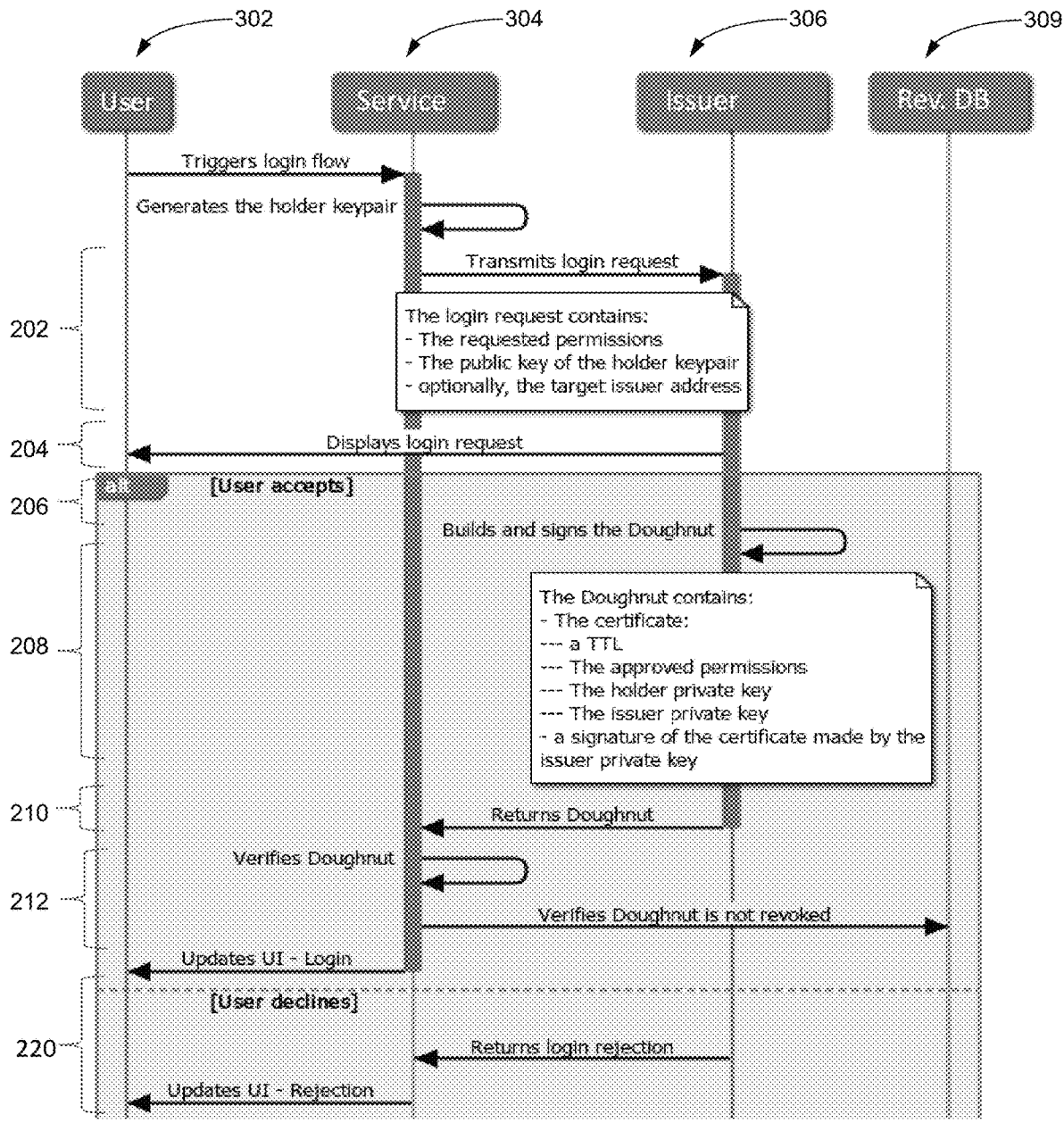
FIG. 3 illustrates data flow in an example where access to a service is provided through a permissions delegation.

FIG. 3 illustrates the data flow of a specific example of permissions delegation. In FIG. 3, User 302 wishes to use service 304 through delegation of permissions from Issuer 306. In this example, user 302 and service 304 each can correspond to a remote computing Platform 104 of FIG. 1 and issuer 306 can correspond to certificate issuer computing platform 102 of FIG. 1. Revocation DB 310 is described in greater detail below in connection with a verification operation. Operations corresponding to operations of FIG. 2 are labeled with the same reference numerals as in FIG. 2.

As shown in FIG. 3, a request for access to service 304 is sent from user 302 to service 304. As an example, service 304 can be a social network, a content provider, a car rental service, or any other service available over a computer network. Service 304 can also be access to a physical device where the permissions certificate is used to gain such access such as by opening a computer-controlled door or lock. In response to the request for access, service 304 generates a cryptographic private/public key pair and transmits a permissions request to issuer 306. Note that the key pair can be created in response to the request or can be preexisting. Therefore, the phrase "generate a key pair" as used herein includes creating a new key pair or using an existing key pair. Issuer 306 can be any platform for which user 302 has permissions through a preexisting account or the like. The permissions request can specify the requested permissions (login access in this example) and the public key of service 304. Further, the permissions request can specify a public address of issuer 306. As an example of access to a physical device, service 304 is the holder, and could be a device with NFC/RFID technology or the like, capable of transmitting the certificate to an access verifier. The original request for permission would have been made when the device was set up, and the issuer could have been the building's access control system. The verifier then knows to trust the access control system's issuer address as a valid issuer, and can trust certificates issued by it.

At this time a login request will be displayed on a UI of user 302 (step 204 of FIG. 2) and, assuming user 302 accepts the login request, by entering a username and password or merely indicating acceptance for example, a permissions certificate will be created to delegate the requested permission from issuer 306 to service 304 (step 208 in FIG. 2). The permissions certificate is then transmitted to service 304 (step 210 in FIG. 2) to allow the user to access service 304. Service 304 is then able to verify that issuer has delegated the permissions to holder. In the case of attenuated permissions, service 304 could use the permissions certificate to act as issuer of other permissions certificates as allowed by the delegated permissions. This is described in greater detail below with reference to the data structure of a permissions certificate in accordance with an implementation. The permissions certificate can be verified through known checks such as a check with revocation DB 309 to see if the permissions certificate has been revoked by issuer 306. As shown at 220 in FIG. 3 (but not shown in FIG. 2), if the user declines the login instead of accepting at 206, the permissions delegation request is rejected by issuer 306 and a permissions certificate is not created. Further, the access request could be accepted by 1) another user, or 2) by an automated service.

It can be seen that the permissions certificate is a delegation of permissions from one party (issuer) to another (holder). The permissions certificate can be used to delegate permissions to accomplish various transactions such as a login transaction or any transaction on a blockchain or other decentralized network. In the case of blockchain transactions, the permissions certificate can be issued off-chain from one private key (the issuer) to another (the holder). The permissions certificate allows the holder to act as the issuer to others, with a subset of permissions.

Permissions certificates can be verified anywhere. This makes them very efficient to manage and use. Permissions certificates of the implementations are only valid when paired with a signature from the holder, helping to mitigate cases where the certificate is stolen. Permissions certificates are cryptographically verifiable access tokens that may be attenuated off-chain. Verifying that the certificate indeed belongs to the Holder (rather than being stolen, for example) can be performed by the transacting party y checking the holder's public key against the transaction proof. When the Holder sends the transaction with a permissions certificate, it will generate a proof and attach to that transaction.

As noted above, a permissions certificate is represented by a data structure. As an example, the data structure can include the following fields and corresponding formats. The field names in the example below are intended to be human readable but can be shortened to decrease data requirements. The inventors have coined the mark DOUGHNUT™ to use in connection with the permissions certificate described herein and thus this term is found in field names in the example below.

| Path | Description | Format |
| --- | --- | --- |
|  | Doughnut root | JSON |
| certificate | Certificate body | Object |
| certificate.version | Doughnut version | Number |
| certificate.expires | Expiry UNIX time (TTL) | Number |
| certificate.not_before | UNIX time indicating when the doughnut becomes viable | Number |
| certificate.holder | Holder's public key | String + Hex |
| certificate.issuer | Issuer's public key | String + Hex |
| certificate.permissions | Permissions body | Object |
| certificate.permissions.[domain] | A permission domain | Any |
| compact | A version-specific compact encoding of certificate | String |
| signature | Issuer signature of certificate | String + Hex |

An example of permissions certificate data structure is set forth below Other examples could use default encoding in a compact, unreadable binary. The example below does not include revocation management data.

```
{
    "certificate": {
        "version": 1,
        "expires": 1547500527
        "not_before": 1547327727,
        "holder":
"97254c471e56eefb1ec988ad0a98150f327e3b791bb26799413b6cf2f6d9b19f13",
        "issuer":
"5fe33be52021fbe7056d7e9ceb0d12dfc938193fe3b54c3ee05021f639f0d95df2",
        "permissions": {
            "cennznet": {
                "GenericAsset": {
                    "transfer": { }
                },
                "d0a98...56d7e9c": {
                    "bet": { }
                }
            }
        }
    },
```

-continued

```
    "compact": "eyJ2ZXJzaW9uIjoxL...bZXQ1OnRydWVfQ==",
    "signature": "e6fb8ec98a83d0a98...59d7e9ce550d1acdf"
}
```

The holder or the issuer may revoke the permissions certificate at any time before it expires at a time indicated in the certificate.expires field. Once the expiration time has passed, the permissions certificate becomes invalid. The permissions certificate can be validated/verified through the following checks:
- the issuer (doughnut.certificate.issuer) can verify the signature (doughnut.signature);
- the holder (doughnut.certificate.holder) can verify the transaction proof (transaction.proof);
- the expiration time (doughnut.certificate.expires), if applicable, must not have passed; and
- the certificate must not have been revoked.

When executing a permissions transaction, the permissions certificate must be valid and contain a at least one valid permissions domain as indicated in the certificate.permissions.[domain] field (where domain may be one of many domains). The delegated permissions are indicated by the doughnut.certificate.permissions.cennznet field (where cennznet is the permissions domain in this example) and can be extracted. As noted above, this field can be empty to indicate full permissions or another default set of permissions. The specified target and arguments, and all consequent internal transactions, should be a subset of the permission set.

As indicated above, in addition to TTL (time-based) expiration, it is often important to include token-revocation in an access token specification to lessen the attack surface of an account, and to provide a means of mitigating a malicious access scenario once detected. There are not many good ways to do this in a decentralized environment such as blockchain, as these generally involve storing hashes for a period of time, e.g. until the TTL runs out, which may be costly.

The disclosed implementations can use a rolling-nonce based revocation system, where every address has a revocation nonce associated with it, and only certificates with a matching nonce are valid. An issuer may increment their nonce at any time, effectively revoking all currently issued certificates (assuming they all used the current revocation nonce—it's possible that doing this could validate a previously invalid certificate with an n+1 n once and a valid TTL). This allows is for a simple "log out all apps" revocation pattern. The rolling nonce based revocation has a small storage footprint, does not require storing hashes/IDs, and does not require an issuer to remember or discover which permissions certificates are in circulation. However, this mechanism cannot revoke a single certificate, making the logout scenario less ideal in some circumstances. The holder is expected to delete the doughnut and holder private key thoroughly.

It is also possible to revoke all certificates issued by a given issuer, and associated with a given holder, using an address revocation scheme. As holder key pairs are only intended to live for the login session duration, and malicious actors are identifiable by their holder address, this mechanism is effective for both logout and malicious actor mitigation scenarios. This approach can rely on an on-chain black/whitelist of addresses. An address revocation scheme allows an attacker to have their access revoked without impacting behaving holders. Also, an issuer may discover the address of a malicious party via auditing and revoke access without needing to discover to which certificates the attacker has access. However, this scheme can have complexity in culling old blacklisted certificates from state and has relatively high storage costs.

It is possible for a hash to be derived from, or another ID assigned to, a permission certificate. This identifier can be used to revoke the certificate. This approach can rely on an on-chain black/whitelist of hashes/IDs. This scheme can be used to revoke specific certificates. However, it is complex to cull old blacklisted certificates from state. Further, the issuer must generate the ID, or calculate the hash, and store it to be used for later revocation.

Permissions certificates inherently require some sort of permissions definitions. The implementations disclosed herein are flexible, so a permissions domain may contain any definition format the domain wants (so long as the domain enforcer knows how to read it). In order to make permissions enforceable against any contract or address entity, contracts and runtime modules should not implement any permission enforcement themselves. Such an implementation requirement may lead to vulnerabilities that would be exploitable. Instead, permissions enforcement should be carried out solely by the transaction party. Transaction parties can attach permissions to their execution interface instead. For example, the code below can be used to attach the permissions certificate to the runtime environment of a blockchain. Various arguments could also be added to the code, such as time periods and other controls.

```
DomainPermissionSet = {
    <ContractName>: { } || { // full contract/module access, or attenuated access
        <MethodName>: { }, // full method access
        ...
    },
    ...
}
```

Electronic storage 120 may comprise non-transitory storage media that electronically stores information. The electronic storage media of electronic storage 120 may include one or both of system storage that is provided integrally (i.e., substantially non-removable) and/or removable storage that is removably, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 102 to function as described herein. Any mechanism for data transmission/exchange can be used. For example, permissions certificates and other data can be transmitted over a network or can be transmitted physically, such as through a QR code or other portable data structure.

Implementations have been described above. However, various modifications can be made as will be apparent to those of skill in the art. Various computing devices and architectures can be used to accomplish the implementations. Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. Processor(s) 122 may be configured to execute modules 108, 110, 112, 114, and/or 116, and/or other modules. Processor(s) 122 may be configured to execute modules 108, 110, 112, 114, and/or 116, and/or other modules by software; hardware; firmware; some combination of software, hardware, and/or firmware; and/or other mechanisms for configuring processing capabilities on processor(s) 122. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, and/or 116 are illustrated in FIG. 1 as being implemented within a single processing unit, in implementations in which processor(s) 122 includes multiple processing units, one or more of modules 108, 110, 112, 114, and/or 116 may be implemented remotely from the other modules. The description of the functionality provided by the different modules 108, 110, 112, 114, and/or 116 described below is for illustrative purposes, and is not intended to be limiting, as any of modules 108, 110, 112, 114, and/or 116 may provide more or less functionality than is described. For example, one or more of modules 108, 110, 112, 114, and/or 116 may be eliminated, and some or all of its functionality may be provided by other ones of modules 108, 110, 112, 114, and/or 116. As another example, processor(s) 122 may be configured to execute one or more additional modules that may perform some or all of the functionality attributed below to one of modules 108, 110, 112, 114, and/or 116.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A certificate issuer computing system for enforcing permissions delegation in a computing environment, the certificate issuer computing system having permissions to execute at least one transaction on behalf of a user the system comprising:
   one or more hardware processors configured by machine-readable instructions to:
      receive a permissions request, from a requesting computing system, for a permissions certificate, the permissions request specifying permissions to execute at least a subset of the at least one transaction on behalf of the user and the permissions request including a cryptographic public key associated with the requesting computing system;
      transmit a login request to a user computing system associated with a user, the login request causing a login interface to be displayed on the user computing system;
      receive an acceptance from the user in response to the login request;
      generate a permissions certificate data structure in response to the acceptance, the permissions certificate data structure including the cryptographic public key associated with the requesting computing device, a cryptographic public key associated with the issuer computing system, a permissions indication indicating the permissions to execute the at least a subset of the at least one transaction on behalf of the user, and a certificate signature of the certificate issuer computer system private key against the certificate object; and
      return the permissions certificate data structure to the requesting computing system whereby the requesting computing system will be permitted to accomplish the at least a subset of the at least one transaction on behalf of the user with a transacting party in place of the certificate issuer computing system based on possession of the permissions certificate data structure paired with a cryptographic signature based on a private cryptographic key associated with the requesting computing system.

2. The system of claim 1, wherein the requesting computing device is configured to:
   build a request for the transaction;
   attach the permissions certificate to the request for the transaction;
   generate a cryptographic proof of the transaction request; and
   transmit the transaction request.

3. The system of claim 2, wherein the permissions certificate is verified by at least one of; the certificate issuer verifying the signature, and/or the requesting computing system verifying the transaction proof.

4. The system of claim 1, wherein the permissions request further specifies a public address of the certificate issuer computing system.

5. The system of claim 1, wherein the permissions request is for multiple permissions certificates, each corresponding to a specific transaction, and the generating comprises generating multiple permissions certificates for each specific transaction.

6. The system of claim 3, wherein the verifying further includes checking for revocation of the permissions certificate.

7. The system of claim 1, wherein the transaction is access to at least one of computing resources and/or a physical property.

8. The system of claim 3, wherein the permissions certificate includes an expiration condition and wherein the verifying includes checking to see if the expiration condition has been satisfied.

9. The system of claim 1, wherein the permissions include at least one permissions domain.

10. The system of claim 1, wherein the permission certificate is part of a tree of permissions certificates that can be used to verify a permission through a chain of multiple parties.

11. The system of claim 1, wherein generating the permissions certificate comprises:
 a) creating an empty certificate object;
 b) attaching the public cryptographic key associated with the requesting computing device to the certificate object;
 c) attaching a public cryptographic key associated with the certificate issuer computing system;
 d) attaching a permissions object to the certificate object, the permissions object specifying the permissions and a permissions domain;
 e) calculating the certificate signature of the issuer private key against the certificate object; and
 f) attaching the signature to permissions object.

12. The system of claim 1, wherein the computing environment is a decentralized computing environment.

13. The system of claim 12, wherein the computing environment comprises a blockchain ledger stored on peer-to-peer nodes.

14. The system of claim 1, wherein the permissions indication is a data structure indicating a subset of permissions held by the certificate issuer computer system.

15. The system of claim 1, wherein the permission indication indicates a delegation of full rights held by the issuer computer system.

16. The system of claim 15, wherein the permissions indication is the absence of a permissions data structure.

17. The system of claim 14, wherein the permissions indicator indicates the right for the holder of the certificate to grant further permissions to another party.

18. The system of claim 17, wherein the further permissions are a subset of permissions held by the certificate issuer computer system.

19. A method, implemented by a certificate issuer computing system, for permissions delegation in a computing environment, the certificate issuer computing system having permissions to execute at least one transaction on behalf of a user, the method comprising:
 receiving a permissions request, from a requesting computing system for a permissions certificate, the permissions request specifying permissions to execute at least a subset of the at least one transaction on behalf of the user and a cryptographic public key associated with the requesting computing system;
 transmitting a login request to a user computing system associated with a user, the login request causing a login interface to be displayed on the user computing system;
 receiving an acceptance from the user in response to the login request;
 generating a permissions certificate data structure in response to the acceptance, the data structure including the cryptographic public key associated with the requesting computing device, a cryptographic public key associated with the issuer computing system, a permissions indication indicating permissions to execute the at least a subset of the at least one transaction on behalf of the user, and a certificate signature of the issuer private key against the certificate object; and
 returning the permissions certificate to the requesting computing system whereby the requesting computing system will be permitted to accomplish the at least a subset of the at least one transaction on behalf of the user with a transacting party in place of the issuer computing system based on possession of the permissions certificate paired with a cryptographic signature based on a private cryptographic key associated with the requesting computing system.

20. The method of claim 19, further comprising the requesting computing device:
 building a request for the transaction;
 attaching the permissions certificate to the request for the transaction;
 generating a cryptographic proof of the transaction request; and
 transmitting the transaction request.

21. The method of claim 20, wherein the permissions certificate is verified by at least one of; the certificate issuer verifying the signature and/or the requesting computing system verifying the transaction proof.

22. The method of claim 19, wherein the permissions request further specifies a public address of the certificate issuer computing system.

23. The method of claim 19, wherein the permissions request is for multiple permissions certificates, each corresponding to a specific transaction, and the generating comprises generating multiple permissions certificates for each specific transaction.

24. The method of claim 21, wherein the verifying further includes checking for revocation of the permissions certificate.

25. The method of claim 19, wherein the transaction is access to at least one of computing resources and/or a physical property.

26. The method of claim 21, wherein the permissions certificate includes an expiration condition and wherein the verifying includes checking to see if the expiration condition has been satisfied.

27. The method of claim 19, wherein the permissions include at least one permissions domain.

28. The method of claim 19, wherein the permission certificate is part of a tree of permissions certificates that can be used to verify a permission through a chain of multiple parties.

29. The method of claim 19, wherein generating the permissions certificate comprises:
 a) creating an empty certificate object;
 b) attaching the public cryptographic key associated with the requesting computing device to the certificate object;
 c) attaching a public cryptographic key associated with the certificate issuer computing system;
 d) attaching a permissions object to the certificate object, the permissions object specifying the permissions and a permissions domain;
 e) calculating the certificate signature of the issuer private key against the certificate object; and
 f) attaching the signature to permissions object.

30. The method of claim 19, wherein the computing environment is a decentralized computing environment.

31. The method of claim 30, wherein the computing environment comprises a blockchain ledger stored on peer-to-peer nodes.

32. The method of claim 19, wherein the permissions indication is a data structure indicating a subset of permissions held by the certificate issuer computer system.

33. The method of claim 19, wherein the permission indication indicates a delegation of full rights held by the issuer computer system.

34. The method of claim 33, wherein the permissions indication is the absence of a permissions data structure.

35. The method of claim 32, wherein the permissions indicator indicates the right for the holder of the certificate to grant further permissions to another party.

36. The method of claim 35, wherein the further permissions are a subset of permissions held by the issuer computer system.

37. A non-transient computer-readable storage medium having instructions embodied thereon, the instructions being executable by one or more processors to perform a method, implemented by a certificate issuer computing system, for permissions delegation in a computing environment, the certificate issuer computing system having permissions to execute at least one transaction on behalf of a user, the method comprising:
    receiving a permissions request, from a requesting computing system for a permissions certificate, the permissions request specifying permissions to execute at least a subset of the at least one transaction on behalf of the user and a cryptographic public key associated with the requesting computing system;
    transmitting a login request to a user computing system associated with a user, the login request causing a login interface to be displayed on the user computing system;
    receiving an acceptance from the user in response to the login request;
    generating a permissions certificate data structure in response to the acceptance, the data structure including the cryptographic public key associated with the requesting computing device, a cryptographic public key associated with the issuer computing system, a permissions indication indicating permissions, and a certificate signature of the issuer private key against the certificate object; and
    returning the permissions certificate to the requesting computing system whereby the requesting computing system will be permitted to accomplish the at least a subset of the at least one transaction on behalf of the user with a transacting party in place of the issuer computing system based on possession of the permissions certificate paired with a cryptographic signature based on a private cryptographic key associated with the requesting computing system.

38. A method for verifying a permissions certificate issued by a certificate issuer computer system for delegating transaction permissions in a computing environment, the certificate issuer computing system having permissions to execute at least one transaction on behalf of a user, the method comprising:
    receiving a permissions certificate, wherein the permissions certificate was constructed by:
        receiving a permissions request, from a requesting computing, system for a permissions certificate, the permissions request specifying permissions to execute at least a subset of the at least one a-transaction on behalf of a user and a cryptographic public key associated with the requesting computing system;
        transmitting a login request to a user computing system associated with a user, the login request causing a login interface to be displayed on the user computing system;
        receiving an acceptance from the user in response to the login request; and
        generating a permissions certificate data structure in response to the acceptance, the permissions certificate data structure including the cryptographic public key associated with the requesting computing device, a cryptographic public key associated with the issuer computing system, a permissions indication indicating permissions to execute the at least a subset of the at least one transaction on behalf of the user, and a certificate
    signature of the issuer private key against the certificate object;
    checking the validity of the permissions certificate by at least one of; the certificate issuer verifying the signature, the requesting computing system verifying the transaction proof, a check that an expiration time specified in the permissions certificate has not passed and/or a check that the permissions certificate has not have been revoked.

* * * * *